United States Patent
Rahn

(10) Patent No.: US 6,576,180 B1
(45) Date of Patent: Jun. 10, 2003

(54) PROCESS FOR THE PRODUCTION OF CORRUGATED PLASTIC TUBES

(75) Inventor: Horst Rahn, Hassfurt (DE)

(73) Assignee: Corma Inc. (CA)

( * ) Notice: Subject to any disclaimer, the term of this patent is extended or adjusted under 35 U.S.C. 154(b) by 0 days.

(21) Appl. No.: 09/393,101

(22) Filed: Sep. 9, 1999

Related U.S. Application Data

(62) Division of application No. 09/081,198, filed on May 19, 1998, now Pat. No. 6,015,282.

(30) Foreign Application Priority Data

Jun. 12, 1997 (DE) .......................... 197 24 857

(51) Int. Cl.[7] ............................................... B29C 47/90
(52) U.S. Cl. ................................ 264/508; 264/237
(58) Field of Search ........................... 264/508, 507, 264/506, 237, 286; 425/336, 396

(56) References Cited

U.S. PATENT DOCUMENTS

| | | | | |
|---|---|---|---|---|
| 3,035,302 A | * | 5/1962 | Lysobey | 264/542 |
| 3,310,620 A | * | 3/1967 | Martelli et al. | 264/526 |
| 3,519,705 A | * | 7/1970 | Pannenbecker | 264/526 |
| 3,597,516 A | * | 8/1971 | Harwood | 264/525 |
| 4,365,948 A | * | 12/1982 | Chaplain | 425/417 |
| 4,710,337 A | * | 12/1987 | Nordstrom | 264/508 |
| 4,911,633 A | * | 3/1990 | Comfort | 425/396 |
| 4,967,539 A | * | 11/1990 | Hansen | 53/453 |
| 5,002,478 A | * | 3/1991 | Lupke | 425/325 |
| 5,318,740 A | * | 6/1994 | Sadr et al. | 264/506 |
| 5,340,299 A | * | 8/1994 | Jarvenkyla et al. | 425/326.1 |
| 5,405,569 A | * | 4/1995 | Lupke | 264/504 |
| 5,476,630 A | * | 12/1995 | Orsing | 264/508 |
| 5,510,071 A | * | 4/1996 | Van Wonderen et al. | 264/166 |

FOREIGN PATENT DOCUMENTS

DE 1039741 * 9/1958

OTHER PUBLICATIONS

German Journal: GAK Apr. 1977, pp. 200–204.*

* cited by examiner

*Primary Examiner*—Robert Davis
*Assistant Examiner*—Joseph S Del Sole
(74) *Attorney, Agent, or Firm*—Bachman & LaPointe, P.C.

(57) ABSTRACT

In a process for the production of corrugated plastic tubes an extrusion device passes plastic material into a perpendicularly arranged injection head for injecting the plastic material into a perpendicularly arranged mold section comprising at least two pairs of movable mold jaws arranged in axially mutually superposed relationship. A drive device is associated with each pair of mold jaws for displacement thereof in the radial and axial directions.

12 Claims, 2 Drawing Sheets

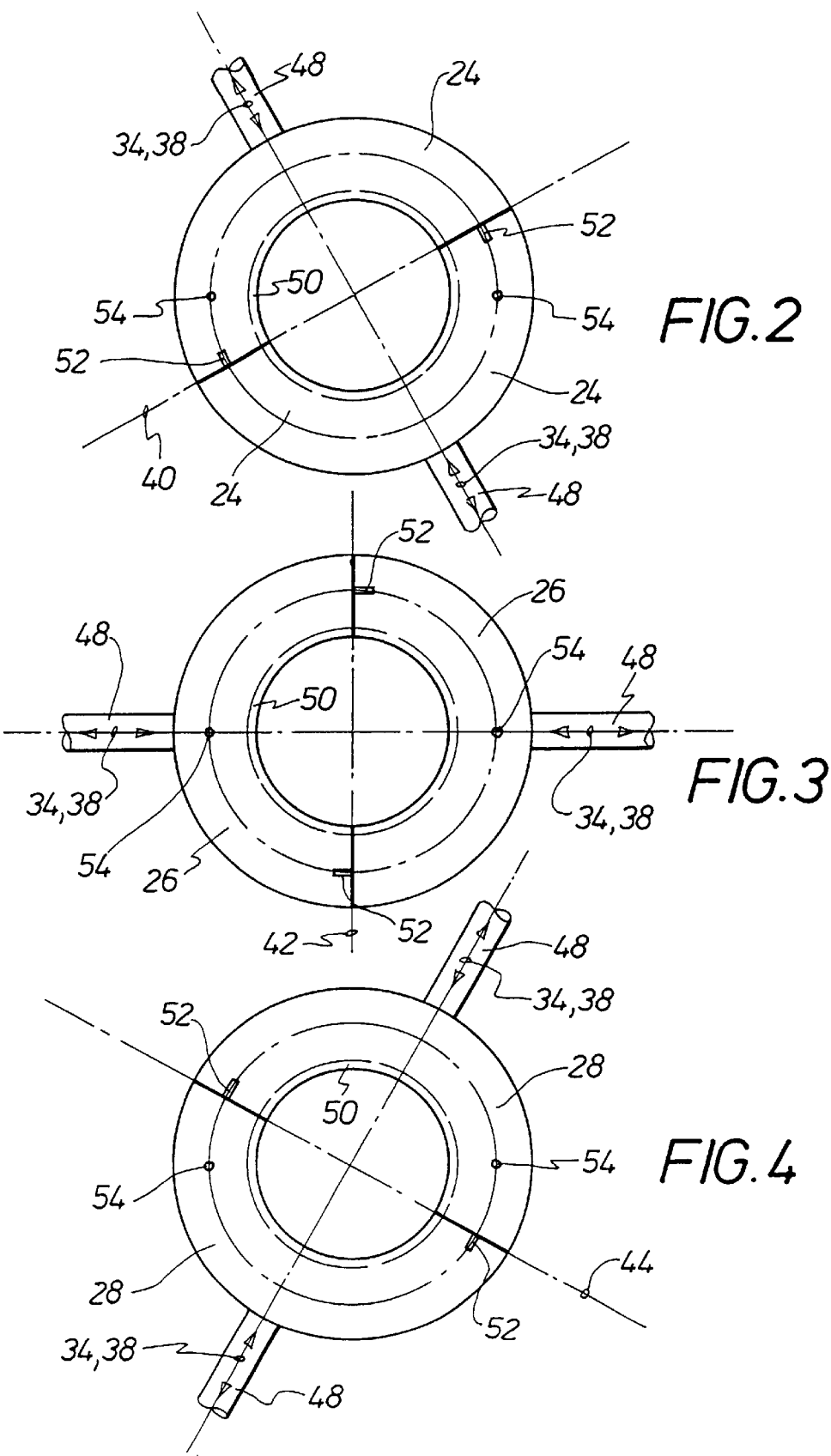

PROCESS FOR THE PRODUCTION OF CORRUGATED PLASTIC TUBES

This is a Division, of application Ser. No. 09/081,198, filed May 19, 1998 now U.S. Pat. No. 6,015,282.

FIELD OF THE INVENTION

The present invention concerns a process for the production of corrugated plastic tubes, more particularly but not exclusively corrugated tubes of a large outside diameter of the order of magnitude of between 1 and 2 m, and an apparatus for the production of corrugated plastic tubes.

It will be noted here that the present invention can be used not only in the production of corrugated tubes made up of a single layer but in principle it can also be adopted for multi-layer tubes in which, in addition to at least one corrugated layer, the tube also has a smooth inside and/or outside skin or surface layer, wherein the various layers are possibly produced by means of different extruders or at least by means of injection heads which provide for dividing up the material involved.

BACKGROUND OF THE INVENTION

In one form of a process for the production of corrugated plastic tubes, a plastic material is passed by means of an extrusion device through an injection head into a mold section which is formed by movable mold jaws and in which the plastic material is caused to bear in molding contact thereagainst by virtue of a reduced external pressure and/or an increased internal pressure. A suitable apparatus for carrying that process into effect comprises the extrusion device connected to at least one injection head with which there is operatively associated a mold section having the movable mold jaws.

Hitherto in such apparatuses the injection head and the mold section operatively associated therewith, having the movable mold jaws, are always arranged horizontally. Such a design configuration can only be used for corrugated plastic tubes of a given maximum outside diameter because, in the molding procedure, progressively more plastic material has to be blown or sucked into the mold jaws by the reduced external pressure or by the increased internal pressure, in the region of the mold section, in particular in the upper part or in the upper third of the fresh corrugated plastic tube, as a result of the increasing wall thickness thereof. In that situation problems arise not only due to the fact that ever increasing pressure or suction forces are required for correspondingly larger amounts of plastic material for corrugated tubes of correspondingly large diameter, but also by virtue of the fact that corrugated tubes of correspondingly large diameter can also be produced only at a suitably reduced extrusion rate. Furthermore, in the case of the previous procedures as outlined above which are implemented in a horizontally oriented mold section when producing corrugated plastic tubes of relatively large outside diameter, the corrugation spacings of adjacent corrugations of the corrugated tube are limited in the decreasing direction, that is to say they are required to be correspondingly large, and that is often something that is not wanted. A further deficiency of the above-outlined previous processes and apparatuses is that leakage effects between the mold jaws and the plastic material when using vacuum or leakage effects between a central calibration or sealing bar or mandrel and the plastic material when using an increased internal pressure, that is to say when effecting a pressure calibration operation, progressively increase, by virtue of the relatively large dimensions of the corrugated plastic tubes. Due to the extrusion rate being relatively low, as already referred to above, the leakage condition also referred to above persists for a correspondingly prolonged period of time, and that is a further deficiency which cannot be disregarded.

DE 36 22 775 C2 discloses an apparatus for the production of ribbed tubes from a moldable material, the tubes having a smooth inside surface. That arrangement has a core region comprising a spindle, a conically enlarging bar or mandrel which is disposed downstream of the spindle in the production direction of the arrangement and a core disposed downstream of the bar or mandrel and being of a substantially constant diameter. The spindle is surrounded by a mouthpiece sleeve which together with the core region forms a mouth for the plastic material. The mouthpiece sleeve and the core region form chill molds which can be conveyed along an endless path and which at their inside surface have grooves, more specifically for shaping ribs on a tube, while an end zone of the core which is at a spacing from the above-mentioned mouth has means for cooling that zone. In that arrangement the core can be cooled by means of a liquid coolant.

DE 31 20 480 A1 discloses an apparatus for the production of plastic tubes having transverse grooves or channels. In that apparatus half-molds which are provided with a molding cavity and which supplement each other in pairs at a mold section to constitute a respective mold are arranged to be circulated on a machine table, wherein arranged upstream of the mold section is an injection head of an extruder and wherein the half-molds are provided with vacuum ducts communicating with the respective mold cavities. The vacuum ducts open in the mold section at vacuum connections provided in the machine table. The half-molds are provided with cooling ducts which communicate in the mold section with cooling water feed means and discharge means which are also provided in the machine table. In order to ensure precise temperature setting for the half-molds during operation of the apparatus the cooling ducts and the vacuum ducts in the respective half-molds are completely separated from each other.

JP Abstract No 59-131433 discloses a process and an apparatus for the production of perforated tubes or perforated ribbed tubes, wherein a punch member which is disposed in a downwardly hanging position can be moved up and down in relation to a bottom tool portion in order thereby to define a correspondingly variable annular gap through which a plastic material is extruded. In that arrangement the respective tube being produced is extruded perpendicularly downwardly.

German published specification (DE-AS) No 1 039 741 describes an apparatus for the fine processing of elongate plastic components such as for example a tube, a hose, a strip or the like, in which the component is passed while still in a plastic condition from an extrusion press through a pressing mouthpiece member of a configuration corresponding to the required definitive shape, into a cooling and hardening bath. There, a stationary or rotating bar or mandrel which is mounted within the mouthpiece member projects through the shaping tool into the interior of the container in which the cooling and hardening bath is disposed. In that arrangement the mouthpiece member is oriented horizontally, in other words the respective component is passed into the cooling and hardening bath horizontally, which signifies that the force of gravity can have a corresponding effect thereon.

German published specification (DE-AS) No 1 280 552 discloses an apparatus for the continuous production of transverse grooves or channels, bulge portions or the like on a tube of thermoplastic material issuing from an extrusion press. The apparatus has a longitudinally divided hollow mold which affords the required profile and which can also be moved with the tube. That mold comprises a plurality of mold portions which are joined together to form two rows and which are provided with guide members such as rollers or the like. The guide members engage into suitable guide tracks by which the mold portions are brought together along the molding region of the apparatus to constitute a closed mold. For the purposes of pressing the tube to be shaped against the interior of the mold the apparatus has a nozzle for the introduction of a pressure medium into that part of the tube. The mutually facing end faces of the individual mold portions bear against each other when the mold portions are being guided in a straight line, wherein the geometrical pivot axes of the mold portions which at the same time form the geometrical axes of the guide members are arranged in the central plane of the end faces of the mold portions of a row, said end faces being in mutually adjacent relationship in the closed condition of the mold.

German published specification (DE-AS) No 1 248 913 discloses an apparatus for the production of corrugated plastic tubes, wherein a device for producing the corrugations is disposed adjoining an annular nozzle of an extrusion press for extruding the tubes. The corrugating device comprises individual dies which supplement each other to afford the desired tube shape and which are brought together in front of the annular nozzle to form a closed tubular mold passage which is provided with corrugation configurations. A device which is held by the mouthpiece member of the extrusion press projects into the mold passage, to expand the tube which is extruded from the press. The dies comprise rotatably mounted, synchronously drivable mold disks whose axes of rotation are arranged on a circle around the mold passage to be formed and whose peripheral surfaces are profiled to correspond to the desired corrugation configuration.

The use of a transverse cutter which is moved simultaneously with an elongate plastic component, for severing that component, is to be found for example in the German journal: GAK 4/1977, pages 200 through 204.

SUMMARY OF THE INVENTION

An object of the present invention is to provide a process for the production of corrugated plastic tubes in which the above-outlined disadvantages and deficiencies can be eliminated in a simple fashion and more specifically corrugated plastic tubes of large outside diameter can be produced at a relatively high extrusion rate while leakage along the mold section can be readily reduced or prevented.

Still another object of the present invention is to provide a process for the production of corrugated plastic tubes which affords a simplified and more rational operating procedure while affording reliable production results.

Still another object of the present invention is an apparatus for the production of corrugated plastic tubes and more especially tubes of large outside diameter which while being of a simple structure entails the attainment of satisfactory products.

Still a further object of the invention is to provide an apparatus for the production of corrugated plastic tubes, which affords greater ease of manipulation of the tubes produced with enhanced versatility of operation.

In terms of the production process the foregoing and other objects of the invention are achieved by a process for the production of corrugated plastic tubes, more especially for example corrugated tubes with a large outside diameter for example of the order of between about 1 and 2 m, wherein a plastic material is passed by means of an extrusion device through at least one injection head into a mold section which is formed by movable mold jaws and in which the plastic material is caused to bear thereagainst in molding contact by virtue of reduced external pressure and/or increased internal pressure. The plastic material is passed downwardly through the injection head which is arranged perpendicularly, into the mold section which is also disposed perpendicularly. The mold section is formed by pairs of the mold jaws which are disposed one above the other and which by means of associated drive units are displaced repeatedly starting from an initial position in a radial direction towards each other, thereafter downwardly in the axial direction of the mold section, then radially away from each other and then axially upwardly again back into the initial position.

A preferred feature of the process of the invention provides that the mold jaws of the pairs thereof are cooled with a fluid in order to be able to correspondingly increase the extrusion rate.

It will be noted at this point that the drive devices for displacement of the mold jaws of the pairs which are disposed in mutually superposed relationship in the radial and axial directions of the mold section can be formed by at least one robot with associated robot arms or by a robot-like, program-controlled machine or apparatus which is for example driven hydraulically or electrically. In that case the above-mentioned robot arms may operate in mutually synchronised relationship to perform an operating procedure comprising a plurality of pilgrim step-like movements in two planes.

A preferred feature of the process of the invention provides that projecting into the mold section is a perpendicular calibration mandrel or bar which is associated with the at least one injection head and which is cooled by a fluid. Such a design configuration for carrying out the process affords the advantage that not only is it possible to apply a reduced external pressure to the mold jaws of the pairs thereof, but also the plastic material issuing from the injection head into the mold section can be acted upon by an increased internal pressure. A calibration bar or mandrel can however also be of advantage in particular in the production of corrugated tubes which have a smooth inside wall surface.

In order to guarantee ease of manipulation of the corrugated plastic tubes of large outside diameter of the order of magnitude of for example between 1 and 2 m, which are produced in accordance with the invention, a preferred feature of the process of the invention provides that the elongate corrugated tube configuration is separated into corrugated tube portions in the feed direction downstream of the mold section by means of a separating or cutting tool, wherein the tool is moved with the elongate corrugated tube configuration simultaneously over a given axial distance.

In a preferred feature the corrugated tube portions are then introduced into a fluid bath in which they are cooled down. After the step of cooling down the corrugated tube portions in the liquid bath the portions can be removed therefrom so that for example connecting elements such as sleeves, sockets or the like can be attached to the cooled corrugated tube portions, for example by being molded thereon, welded thereto or injection-molded thereto. This procedure can be implemented by means of conventional equipment. The corrugated tube portions can then be turned into a horizontal position and stored or packaged for example on pallets or other suitable transport devices.

In regard to the apparatus the foregoing and other objects of the invention are attained by an apparatus for the production of corrugated plastic tubes, more especially tubes of a large outside diameter of the order of magnitude of for example between about 1 and 2 m, comprising an extrusion unit connected to at least one injection head with associated mold section comprising movable mold jaws. The at least one injection head and the mold section are arranged perpendicularly, while the mold section comprises at least first and second pairs of mold jaws disposed in axially mutually superposed relationship. Associated with each pair of mold jaws for stepwise displacement of the corresponding two mold jaws in the radial and axial directions is a drive assembly. As already indicated above the drive assembly may be formed by robots with robot arms or by robot-like machines or apparatuses which are operable under program control, hydraulically or electrically. The perpendicular orientation of the injection head and the mold section generally reduce or eliminate irregular distribution of plastic material, due to the force of gravity, along the periphery of the elongate corrugated tube configuration which is formed in the mold section, so that it is readily easily possible to produce corrugated tubes of a large outside diameter of the order of magnitude of between about 1 and 2 m, at a relatively high extrusion rate. It will be appreciated that in accordance with the principles of the invention it is also possible to produce corrugated tubes of an outside diameter of less than 1 m or larger than 2 m.

In a preferred feature of the apparatus according to the invention the mold jaws can have a vacuum applied thereto so that the elongate corrugated tube configuration produced in the mold section can be subjected to the effect of a reduced external pressure along the mold section.

In a preferred feature the mold jaws include fluid cooling means in order to effect corresponding cooling of the elongate corrugated tube configuration along the mold section and in order also thereby to be able to increase as desired the extrusion rate even in the production of corrugated plastic tubes of relatively large outside diameter.

In accordance with another preferred feature of the invention, the separating planes of the mold jaws of the pairs thereof which are arranged in mutually axially superposed relationship are displaced in the peripheral direction relative to each other through a given angle, so that in that way the drive devices for the mold jaws of the pairs do not mutually impede or adversely affect each other during their displacement in the radial and axial directions. The above-mentioned angle can be selected in dependence on the number of pairs of mold jaws. If for example in accordance with the invention two pairs of mold jaws are used then the angle through which the pairs are displaced relative to each other in the peripheral direction can be 180° (=360°÷2). If for example the apparatus of the invention involves the use of three pairs of mold jaws then the angle through which the separating planes of the mutually superposed pairs are displaced relative to each other in the peripheral direction can be 120° (=360°÷3). In a preferred embodiment of the apparatus of the invention three pairs of mold jaws are disposed in mutually superposed relationship.

It will be noted that the apparatus according to the invention has the advantage that it can deal with a relatively wide range of possible dimensions of corrugated plastic tubes to be produced, in regard to outside diameter and/or corrugation spacings of the tubes. A further advantage is that a change in dimension as required can be easily implemented within a short period of time. The mold jaws of the pairs can be removed for example by the robot arms of the above-discussed drive assembly. Immediately thereafter the mold jaws of the required new size can be picked up by the robot arms. In order to eliminate possible inaccuracies in the drive assembly or the robot it is preferable for the mold jaws of the pairs to have centering and locking means. By virtue of suitable operation of the centering and locking means the mold jaws of the pairs are centered and locked together in accurately fitting relationship along the mold section both in the axial direction and also in the peripheral direction when the mold jaws are suitably moved or brought together by means of the respectively associated drive units. That not only prevents any undesired displacement as between the radially oppositely disposed mold jaws of the respective pair but, as already mentioned above, possible inaccuracies in the drive units for the pairs of mold jaws are also eliminated. Therefore the centering and locking means provide for accurate alignment and positioning of each respective pair of mold jaws relative to the axially adjacent pair.

A preferred feature of the apparatus according to the invention provides that a perpendicularly arranged calibration mandrel or bar which is associated with the injection head projects into the mold section and can be supplied with air under pressure. Such a design configuration affords the advantage that the plastic material in the mold section can be subjected to the effect of a suitable increased internal pressure in order thereby further to improve the degree of precision of shaping of the elongate corrugated tube configuration in the mold section. That improvement also involves an increase in the extrusion rate. It is preferable for the calibration mandrel or bar to have a fluid cooling means in order further to contribute to the last-mentioned aim of increasing the extrusion rate.

Preferably, a severing tool is arranged downstream of the mold section of the apparatus for dividing the elongate corrugated tube configuration into a plurality of separate corrugated tube portions. The severing tool may be for example a saw for cutting the continuously produced alongate corrugated tube configuration for example into corrugated tube portions each of a length of for example 6 m.

In order to guarantee an accurate cut, it is desirable for the separating tool to be movable simultaneously with the elongate corrugated tube configuration over a given distance. The length of the distance over which the tool moves with the elongate corrugated tube configuration is dependent on the rate of extrusion of the elongate corrugated tube configuration and the cutting speed of the tool, in other words, the distance over which the tool moves is directly proportional to the extrusion rate and inversely proportional to the cutting speed of the tool.

So that in particular corrugated plastic tubes of large diameter and relatively large wall thickness or gauge can be suitably cooled in the optimum fashion, more specifically reliably and also within a relatively short period of time, the apparatus according to the invention is preferably provided with a fluid bath. The fluid bath can be of a depth which is adapted to the length of the corrugated tube portions, with its width being larger than the outside diameter thereof. The fluid bath is desirably of such a depth and width that the corrugated tube portions to be cooled can completely dip into the fluid in the bath and can emerge laterally beside the immersion region or the operating region of the drive assembly for the mold jaws. The cooled corrugated tube portions can then be removed perpendicularly from the fluid bath again and pivoted into a horizontal position.

Further objects, features and advantages of the process and apparatus according to the invention will be apparent from the following description of a preferred embodiment thereof.

BRIEF DESCRIPTION OF THE DRAWING

FIG. 2 is a view in section taken along line II—II in FIG. 1 through the upper pair of mold jaws, FIG. 3 is a view similar to FIG. 2 in section taken along line III—III in FIG. 1 through the central pair of mold jaws, and FIG. 4 is a view similar to FIGS. 2 and 3 in section taken along line IV—IV in FIG. 1 through the lower pair of mold jaws, with the upper, central and lower pairs of jaws forming the mold section of the apparatus.

DESCRIPTION OF THE PREFERRED EMBODIMENT

Figure 1:
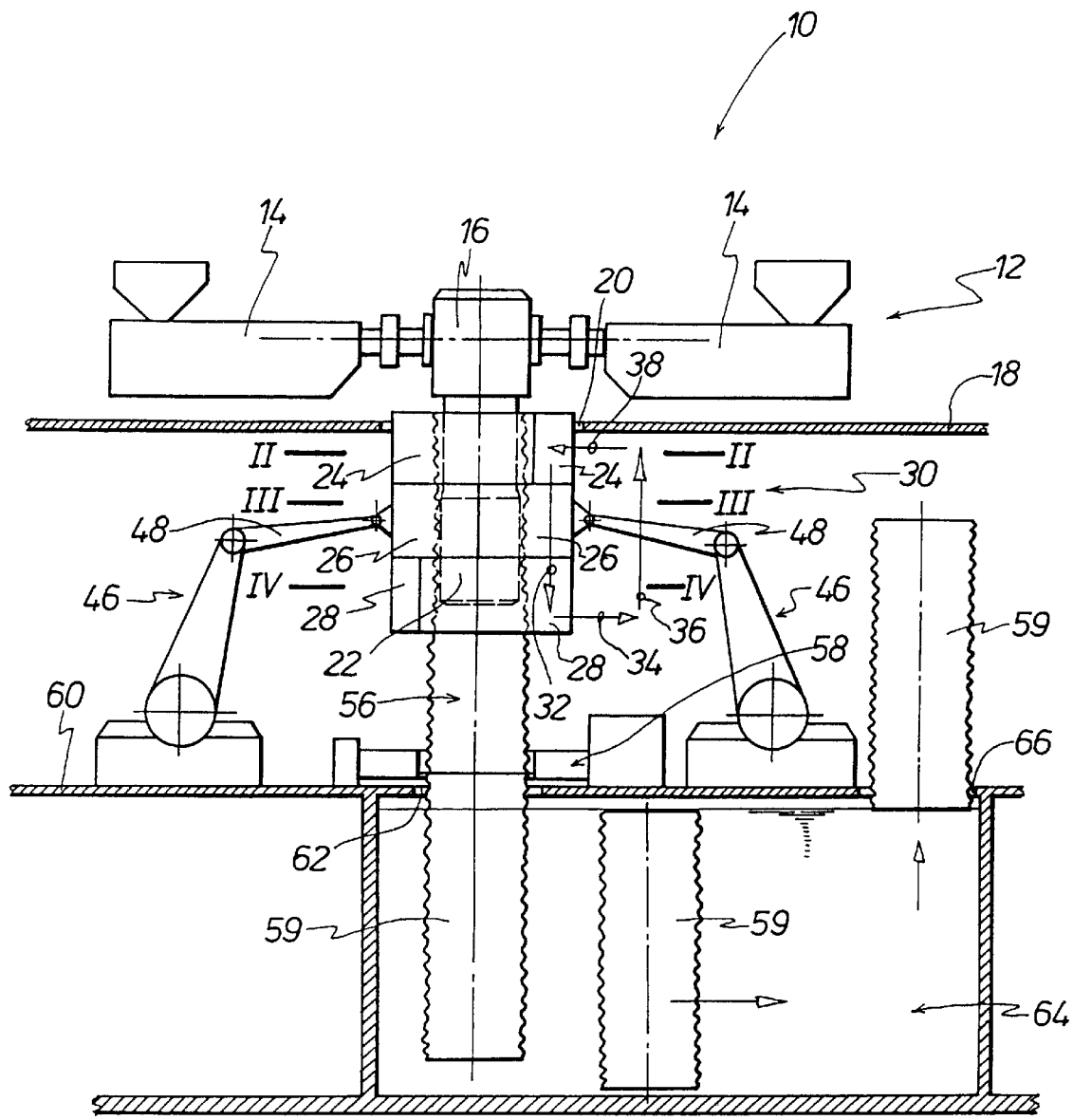
FIG. 1 is a diagrammatic front view of an embodiment of an apparatus for the production of corrugated plastic tubes.

Referring firstly to FIG. 1, diagrammatically shown therein is a front view of an embodiment of an apparatus 10 for the production of corrugated plastic tubes, more particularly for example corrugated tubes of a large outside diameter for example of the order of magnitude of between 1 and 2 m. The apparatus 10 includes an extrusion device 12 with at least one extruder 14, of which there are two in the illustrated embodiment, which are connected to at least one injection head 16, whereby a composite tube of a two-layer structure can be produced. The extrusion device 12 is arranged at an upper level on a plate member as indicated generally at 18 which is provided with a through hole 20. The injection head 16 is arranged perpendicularly and it extends through the hole 20 in the plate member 18. The injection head 16 is combined with a calibration bar or mandrel 22 which is also disposed in perpendicularly hanging relationship and which serves for example to define and form a smooth inside wall surface for a multi-layer composite tube.

The injection head 16 and the calibration bar or mandrel 22 are surrounded by mold jaws indicated at 24, 26 and 28, which form a mold section indicated generally at 30. The mold jaws 24, 26 and 28 are simultaneously displaceable axially and radially as is indicated in FIG. 1 by respective arrows 32, 34, 36 and 38. So that the mold jaws 24, 26 and 28 do not impede each other in their pilgrim step-like movements as indicated by the arrows 34, 36 and 38, the mold jaws 24, 26 and 28 are arranged in mutually displaced relationship, as viewed in the peripheral direction, in such a way that the separating plane indicated at 40 in FIG. 2 in respect of the mold jaws 24, the separating plane indicated at 42 in FIG. 3 in respect of the mold jaws 26 and the separating plane indicated at 44 in FIG. 4 in respect of the mold jaws 28 are displaced in the peripheral direction relative to each other through a given angle. When there are three pairs of mold jaws 24, 26 and 28, that angle is for example 120°.

Associated with each pair of mold jaws 24, 26 and 28 are drive devices indicated at 46 in FIG. 1. It will be noted that FIG. 1 only shows the drive device 46 which is operatively associated with the pair of mold jaws 26. The drive devices are for example formed by per se known robots having robot arms respectively indicated at 48 in FIG. 1. Portions of those robot arms however are also illustrated in each of FIGS. 2, 3 and 4. By means of the drive devices 46 the mold jaws 24, 26 and 28 can be simultaneously suitably displaced in succession in the axial and radial directions, as indicated by arrows 32, 34, 36 and 38 in FIG. 1 and by arrows 34 and 38 in each of FIGS. 2, 3 and 4.

The mold jaws 24, 26 and 28 are provided in known manner with vacuum ducts (not shown) so that the corrugated or ribbed internal surface as indicated at 50 in each of FIGS. 2, 3 and 4 of the mold jaws 24, 26 and 28 can be subjected to the action of a vacuum. The mold jaws 24, 26 and 28 are also provided with a known fluid cooling arrangement which is not illustrated herein.

As can be clearly seen from FIGS. 2 through 4 the mold jaws 24, 26 and 28 of the respective pairs are provided with suitable centering and locking devices indicated at 52 and 54. The devices 52 are disposed in the respective separating plane 40, 42 and 44 of the respective pairs of mold jaws 24, 26 and 28. The devices 54 are disposed in the bottom and top surfaces of the respective mold jaws 24, 26 and 28 at the same respective location as viewed in the peripheral direction of the mold jaws. The devices 52 and 54 prevent both radial and also axial displacement and displacement in the peripheral direction of the mold jaws 24, 26 and 28.

The calibration bar or mandrel 22 of the apparatus 10 as shown in FIG. 1 is desirably provided with compressed air ducts (not shown) for an internal feed of compressed air in the interior of the corrugated plastic tube being produced and also with cooling ducts (not shown) to provide a fluid cooling effect.

An elongate corrugated tube configuration which is diagrammatically indicated at 56 in FIG. 1, of relatively large outside diameter, is continuously produced at a comparatively high extrusion rate along the mold section 30 as shown in FIG. 1. The extrusion rate is indicated by the arrow 32 in FIG. 1.

Disposed downstream of the mold section 30 formed by the respective pairs of mold jaws 24, 26 and 28 is a separating or severing tool 58 which is simultaneously moved over a given distance with the elongate corrugated tube configuration 56 as it issues from the mold section 30, in order to permit precise accurate severing of the elongate corrugated tube configuration 56 to form corrugated tube portions 59 therefrom. The tool 58 and the drive devices 46 for the mold jaws 24, 26 and 28 are arranged at a lower level constituted by a lower plate member indicated at 60, with the tool 58 being disposed above a through hole 62 in the plate member 60. Disposed below the plate member 60 is a fluid bath 64 into which the corrugated tube portions 59 are dipped through the hole 62 in the plate member 60. The corrugated tube portions 59 are cooled down in the fluid bath 64. The cooled corrugated tube portions 59 can then be removed from the fluid bath 64 again through a discharge opening 66 in the plate member 60 and then subjected to further processing, for example being provided with connecting elements such as sleeves, sockets or the like, for example by a molding operation, a welding operation or an injection-molding operation.

It will be appreciated that the above-described process and apparatus according to the invention have been set forth solely by way of example and illustration of the principles thereof and that various modifications and alterations may be made therein without thereby departing from the spirit and scope of the invention.

What is claimed is:

1. A process for the production of corrugated plastic tubes comprising:

passing a plastic material by means of an extrusion device downwardly through at least one perpendicularly arranged injection head into a perpendicularly arranged mold section; molding corrugated plastic tubes from the plastic material in the mold section by the plastic material being caused to bear against said mold section in molding contact therewith by virtue of at least one of reduced external pressure and increased internal pressure: wherein the mold section is formed by pairs of movable mold jaws which are disposed one above the other and which are displaced repeatedly starting from an initial position in a radial direction towards each other, thereafter in the axial direction of the mold section downwardly, then radially away from each other and then axially upwardly back into said initial position again;

including arranging separating planes of the mold jaws of the pairs in axially mutually superposed relationship and displacing said mold jaws in a peripheral direction relative to each other through at least one angle.

2. A process for the production of corrugated plastic tubes comprising:

passing a plastic material by means of an extrusion device downwardly through at least one perpendicularly arranged injection head into a perpendicularly arranged mold section; molding corrugated plastic tubes from the plastic material in the mold section by the plastic material being caused to bear against said mold section in molding contact therewith by virtue of at least one of reduced external pressure and increased internal pressure: wherein the mold section is formed by pairs of movable mold jaws which are disposed one above the other and which are displaced repeatedly starting from an initial position in a radial direction towards each other, thereafter in the axial direction of the mold section downwardly, then radially away from each other and then axially upwardly back into said initial position again;

including arranging separating planes of the mold jaws of the pairs in axially mutually superposed relationship and displacing said mold jaws in a peripheral direction relative to each other through a given angle.

3. A process as set forth in claim 2 including the step of cooling the mold jaws of the pairs thereof with a fluid.

4. A process as set forth in claim 2, including the steps of projecting a perpendicular calibration mandrel operatively associated with said injection head into the mold section and cooling said mandrel by fluid.

5. A process as set forth in claim 2 including the step of separating the elongated corrugated tube configuration produced in said mold section into corrugated tube portions by means of a separating tool downstream of the mold section in the feed direction of the molded corrugated tube configuration, with the tool being moved over a given distance simultaneously with said molded tube configuration.

6. A process as set forth in claim 5, including introducing said corrugated tube portions into a fluid bath to be cooled therein.

7. A process as set forth in claim 2 including applying a vacuum to the mold jaws.

8. A process as set forth in claim 2 including the steps of centering and locking the mold jaws of the pairs with centering and locking means.

9. A process for the production of corrugated plastic tubes comprising:

extruding plastic material into at.least one perpendicularly arranged injection head, injecting the plastic material from the injection head into a perpendicularly arranged.mold section in which the injected plastic material is.caused to bear against the surface of the mold section in molding contact therewith to produce a corrugated plastic tube configuration from the plastic material in the mold section, wherein the mold section comprises pairs of mold jaws which are disposed in mutually superposed relationship and which are displaced repeatedly from an initial position in a radial direction towards each other, thereafter in the axial direction of.the mold section downwardly, then radially away from each other and then axially upwardly again into said initial position;

including arranging separating planes of the mold jaws of the pairs in axially mutually superposed relationship and displacing said mold jaws in a peripheral direction relative to each other through a given angle.

10. A process as set forth in claim 9, including causing said plastic material to bear against said mold section in molding contact therewith by virtue of a differential pressure.

11. A process as set forth in claim 10, including producing said differential pressure by the formation of a reduced external pressure.

12. A process as set forth in claim 10, including producing said differential pressure by an increased internal pressure.

* * * * *